US009298706B2

(12) United States Patent
    Magnell

(10) Patent No.: US 9,298,706 B2
(45) Date of Patent: Mar. 29, 2016

(54) SYSTEM AND METHOD FOR MAKING CUSTOM BOXES FOR OBJECTS OF RANDOM SIZE OR SHAPE

(71) Applicant: Plymouth Packaging Inc., Battle Creek, MI (US)

(72) Inventor: Greg Magnell, Kalamazoo, MI (US)

(73) Assignee: Plymouth Packaging Inc., Battle Creek, MI (US)

( * ) Notice: Subject to any disclaimer, the term of this patent is extended or adjusted under 35 U.S.C. 154(b) by 252 days.

(21) Appl. No.: 13/780,841

(22) Filed: Feb. 28, 2013

(65) Prior Publication Data

US 2013/0221088 A1     Aug. 29, 2013

Related U.S. Application Data

(60) Provisional application No. 61/604,865, filed on Feb. 29, 2012.

(51) Int. Cl.
    *G06F 17/00*     (2006.01)
    *G06F 17/30*     (2006.01)
    *B31B 1/00*      (2006.01)

(52) U.S. Cl.
    CPC .  *G06F 17/30* (2013.01); *B31B 1/00* (2013.01); *B31B 2201/95* (2013.01); *B65B 2210/04* (2013.01)

(58) Field of Classification Search
    USPC ....................................................... 235/375
    See application file for complete search history.

(56) References Cited

U.S. PATENT DOCUMENTS

| 5,331,118 | A  | * | 7/1994  | Jensen ................... G01B 11/00 177/245 |
| 6,615,104 | B2 |   | 9/2003  | England et al. |
| 7,085,687 | B2 |   | 8/2006  | Eckenwiler et al. |
| 7,366,643 | B2 |   | 4/2008  | Verdura et al. |
| 7,647,752 | B2 | * | 1/2010  | Magnell ..................... B65B 5/02 493/52 |
| 7,788,883 | B2 | * | 9/2010  | Buckley ................. G06Q 30/06 382/154 |
| 8,643,717 | B2 | * | 2/2014  | Li .......................... G01B 11/02 348/128 |
| 2003/0083763 | A1 |  | 5/2003  | Kiyohara et al. |
| 2003/0200111 | A1 |  | 10/2003 | Damji |
| 2005/0180804 | A1 | * | 8/2005 | Andrew .................... G06K 5/02 400/703 |

* cited by examiner

*Primary Examiner* — Michael G Lee
*Assistant Examiner* — David Tardif
(74) *Attorney, Agent, or Firm* — Dinsmore & Shohl LLP

(57) ABSTRACT

A system and method for making custom boxes for objects of random size or shape includes physical measurement apparatus having two or more mutually orthogonal surfaces, each surface including a plurality of computer-readable codes representing distances to one of the other surfaces. At least one object is placed or transferred into apparatus so as to contact as many of the surfaces as possible. The codes are read on each surface to determine the greatest physical extent of the object in multiple dimensions, and the dimensions are delivered to a carton making machine to construct a custom carton to accommodate the object in the multiple dimensions. The physical measurement apparatus preferably includes a primary horizontal surface and two upstanding vertical surfaces, and the computer-readable codes are scannable bar codes arranged as matrices on each surface.

16 Claims, 1 Drawing Sheet

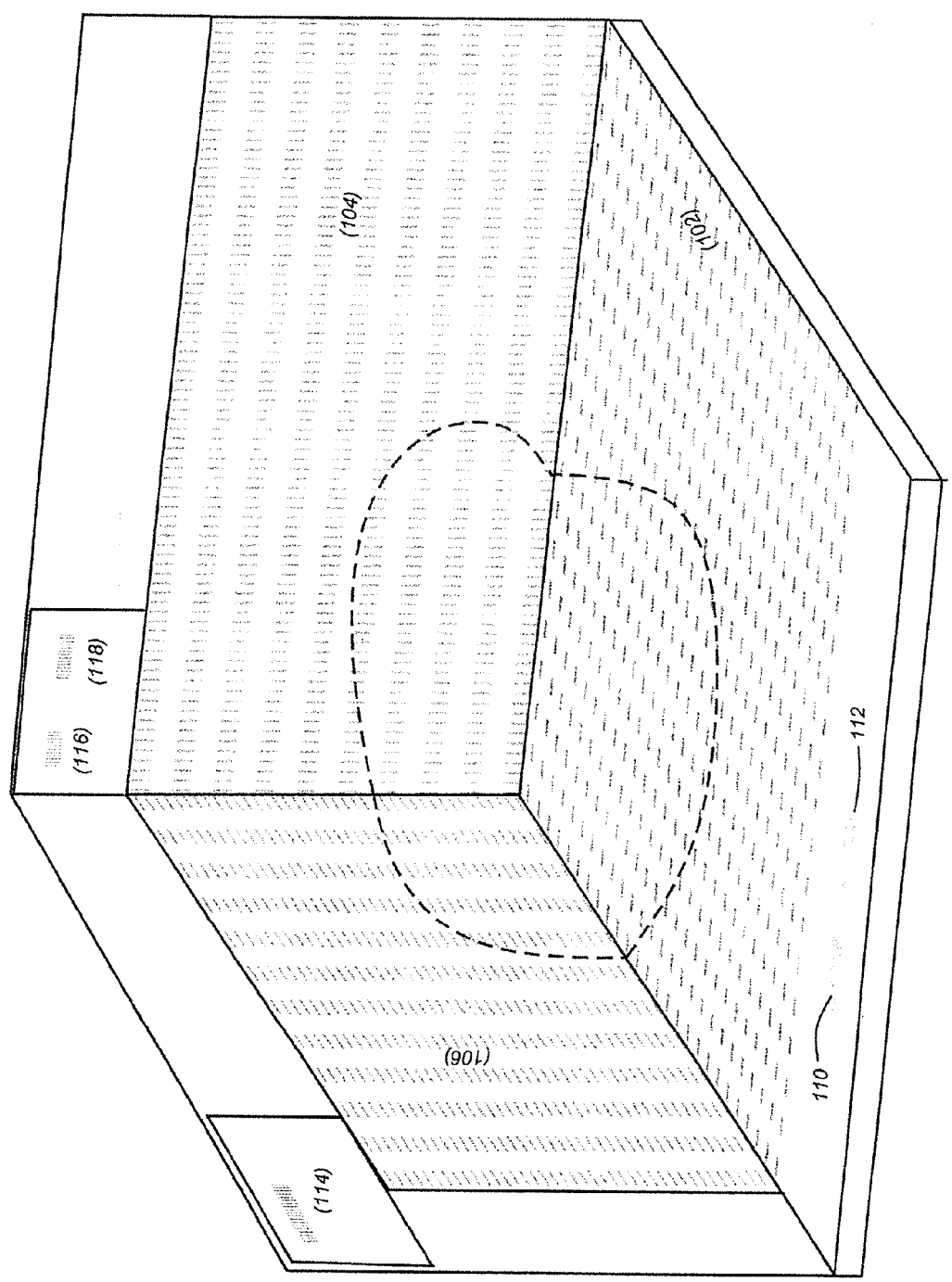

SYSTEM AND METHOD FOR MAKING CUSTOM BOXES FOR OBJECTS OF RANDOM SIZE OR SHAPE

REFERENCE TO RELATED APPLICATION

This application claims priority to U.S. Provisional Patent Application Ser. No. 61/604,865, filed Feb. 29, 2012, the entire content of which is incorporated herein by reference.

FIELD OF THE INVENTION

This invention relates generally to carton construction and, in particular, to a system and method for making custom boxes for objects of random size or shape.

BACKGROUND OF THE INVENTION

There are many industries that must package objects having different sizes for shipment, warehousing, and other operations. There are commercially available carton-producing machines that are capable of producing customized boxes in the size and style needed. Such machines use corrugated cardboard to produce boxes on demand that vary in dimensions typology and quantity. Required box dimensions are either input manually or determined from a bar code associated with a previously generated list of carton sizes. Based upon this input, fan-fold raw material having a sufficient width is drawn from a station and delivered to a staging area. From there, the material is cut and scored to produce a flat panel that may be folded and glued or stapled to produce a box large enough to fit the object to be packaged. Although such systems reduce waste by providing material of varying width, a more automated dimensioning capability would enhance efficiency and reduce costs.

SUMMARY OF THE INVENTION

This invention resides in a system and method for making custom boxes for objects of random size or shape. The system includes a physical measurement apparatus having a primary horizontal surface and a first vertical surface at an angle to the primary surface creating a first inside edge into which at least one object is positioned for measurement. Each of the primary and first vertical surfaces includes a plurality of computer-readable codes, each code representing a distance from the first inside edge. A reader is provided for reading the computer-readable codes associated with the greatest physical extent of the object in two dimensions, one of the dimensions being parallel to the horizontal surface and the other dimension being parallel to the first vertical surface. A processor is operative to receive the codes from the reader and output instructions to a carton making machine to construct a custom carton to accommodate at least the two dimensions of the object.

The apparatus may include a second vertical surface enabling the reader to determine the greatest physical extent of the object in a third dimension from the second inside edge parallel to the second vertical surface, with the processor being operative to direct a carton making machine to construct a three-dimensional custom carton to accommodate the object. In the preferred embodiment the computer-readable codes are scannable bar codes arranged in matrices on each surface, and all of the surfaces are mutually orthogonal. The apparatus may further include separate computer-readable control codes to perform operations such as CANCEL, REPEAT, or SEND the instructions to the carton-making machine.

A method of fabricating a custom box for objects of random size or shape, comprising the step of providing a physical measurement apparatus having two or more mutually orthogonal surfaces, each surface including a plurality of computer-readable codes representing distances to one of the other surfaces. At least one object is placed into apparatus so as to contact as many of the surfaces as possible. The codes are read on each surface to determine the greatest physical extent of the object in multiple dimensions; and the dimensions are delivered to a carton making machine to construct a custom carton to accommodate the object in the multiple dimensions. The physical measurement apparatus preferably includes a primary horizontal surface and two upstanding vertical surfaces, and the computer-readable codes are scannable bar codes arranged as matrices on each surface.

DESCRIPTION OF THE DRAWING

FIG. 1 depicts a preferred corner structure used in the dimensional measuring process according to the invention.

DETAILED DESCRIPTION OF THE INVENTION

This invention enables producers and distributors of random-sized objects to manufacture corrugated cartons or protective corrugated inner-packs that are specifically sized to individual objects or groups of objects. The apparatus combines a physical 'corner' measurement apparatus, a machine-readable code reader, a processing unit, and software to interpret the data from the physical apparatus and transmit the data to a compatible box-making machine. In the preferred embodiment, the machine-readable codes are bar codes read with a scanner. The box-making machine preferably uses one or multiple continuous web(s) of corrugated material.

The invention provides a simple, inexpensive system and accompanying method to produce a carton for an object of a given size by placing the object or objects into the 'corner structure' with codes that are read to determine the minimum bounding dimensions. These dimensions are then transferred to an automatic carton-making system. The carton may be a corrugated or non-corrugated carton, with the carton-making system preferably being supplied with a continuous feed of raw material which may be "fanfolded," for example.

The dimensional measuring process, integrated with an automatic or semi-automatic carton-making machine, allows for the production of the smallest possible protective carton for each corresponding unit to be packed. This allows the user to consume less corrugated material for the protective package, reduces the weight of the overall package, minimizes the amount of protective inner-packaging materials, and minimizes the amount of shipping space per package. The system also impacts the process of selecting and transporting protective cartons to the area(s) where products are packed.

FIG. 1 depicts the corner structure used in the dimensional measuring process. The structure has a primary surface 102, a first vertical surface 104 oriented normal to the primary surface, and a second vertical surface vertically 106 normal to both the first vertical surface and the primary surface. Each surface includes a matrix of computer-readable codes. Each row of codes comprises a unique ID or measurement value. Each row may or may not have an equal spacing from the row above or below, and each matrix may comprise from one to multiple columns. Each matrix for each surface may use a unique symbol within a row ID that corresponds to the length, width or height value. An optional a set of rollers may be mounted on the primary surface between the columns in the bar code matrix. As a further option, the apparatus may have only two surfaces; namely, one primary surface and one secondary vertical surface. In such an embodiment, a matrix is provided on either the primary or secondary a matrix to measure two dimensions.

In operation, a user places the object or objects into the corner then reads the code representing the greatest physical extend of the object(s) to be packaged with a wireless or corded handheld scanner. In FIG. 1, the object(s) is represented by the broken lines, and the codes with the arrows would be scanned to correspond to the measurements in x, y and z. Other codes 110-118 may be provided which, when scanned perform functions such as cancel, repeat, and send.

With measuring complete, the system sends the dimensional data to a processing unit programmed with software to operate a box-making machine. The processing unit may be a PC, PLC, tablet, smart phone, or other processor with a primary input interface (i.e., serial (RS-232 or similar), keyboard wedge, USB, blue-tooth, Ethernet IP, wireless IP based, or other), an output interface (serial (RS-232 or similar), Ethernet, wireless, or other), and a secondary input interface, keyboard, touch screen, or etc.

The software program receives data via the code reader that is attached via serial, keyboard, USB, or other type of interface. The data received represents the information stored in the code matrix of the physical corner apparatus. The processor may receive data in sequence order (row on primary, row on secondary 1, row on secondary 2, and so on) or in any sequence. The data received may be actual value of measurement (120 mm or 10", etc), or it may be an ID of a row in a matrix whereby a lookup table is used to equate a measurement value against a row ID. The data received may further include a symbol that identifies the type of ID or measurement received (length, width or height type).

After receiving data from physical apparatus, measurement values are derived or stored, formatted into an output format pertaining to a protocol required and transmitted via an output interface. The software may include options for user to input other attributes to send to the box-making machine (quantity, type of box to be used, type of corrugated web material to be used). The software may also automatically interpret measurements to provide other attributes to send to the box making machine.

With the measuring complete, the processor sends the dimensional data over an integration link to an automatic or semi-automatic corrugated carton-making system. The integration link may be a direct link to the computer system on the box-making machine, or a link to an intermediate computing system which, in turn, sends a modified set of information to the box-making system. The corrugated carton/box-making system receives the dimensional data over a direct or network connection.

The dimension data may be sent directly to the carton-making system via the output interface of the measurement processor, or to another processing platform. The carton-making machine determines the type or design of box to use, the dimensions, and the quantity to produce. The design and quantity can either be set at default values or added by an operator at the time of dimension data receipt. The carton-making machine may also set default threshold values that conditionally determine the carton design to be used. For example, if dimension "1" is below a set threshold—carton design 1 is used. If dimension 1 is above a threshold—carton design "2" is used.

The type of carton-making machine is preferably an automatic setup machine capable of producing a wide range of carton sizes and styles. The machine will typically produce single cartons of a different size in succession. The carton-making machine will preferably use a continuous feed of fan-folded corrugated material as a base raw material.

Based on the dimensions received and type or design of carton to use, the carton-making machine will automatically position all cutting and scoring mechanisms, and feed/index raw material to produce the appropriately sized carton. The carton-making machine may be composed of an automatic creasing and cutting machine only. In this case the finished carton will be flat with creases and cuts positioned according to the dimensions received and design used. Subsequent processing equipment may be included in the corrugated converting system. In this case subsequent actions such as carton gluing, taping or stapling or erecting may be performed manually or automatically as technology permits.

When the carton-making machine receives dimensional data from the measuring apparatus, the software integration may automatically provide a default type of carton pattern to use or a prompt to the machine operator. The software interface may also provide a rule-based program that chooses different types of carton patterns to be used when the dimensions received fall with certain thresholds. For example, if the height dimension received is below a certain value, a specific box pattern should be used that is different from a default value.

The software interface also provides the ability for the operator to enable or disable the receipt of information from the measuring apparatus. The software interface may also provide other information that is required by the carton-making machine to produce a box. For example, a raw material type may be necessary, or the desired quantity of cartons to be produced. Based on the dimensions received and type or design of carton to use, the carton-making machine should be able to automatically position all cutting and scoring mechanisms, and feed/index raw material to produce the appropriately sized carton. Examples of this type of machine are manufactured by Panotec SRL of Italy, Autobox of the United Kingdom, Emsize of Sweden, and T-ROC of Arkansas USA.

The carton-making machine may be composed of an automatic creasing and cutting machine only. In this case the finished carton will be flat with creases and cuts positioned according to the dimensions received and design used. Subsequent processing equipment may be included in the corrugated converting system to fold or perform other operations to further process the carton for packing. In this case subsequent actions such as carton gluing, taping or stapling or erecting may be performed.

Once a box has been produced by the carton-making machine, it will typically be ejected onto a conveyor or table. If the object that has been measured is to be immediately placed into the carton the conveying system of the measuring apparatus and the exit conveyor of the carton-making machine should be synchronized such that there is a minimal distance between the object and the produced carton.

Overall, the invention consumes less corrugated paperboard material for the protective package, reduces the weight of the overall package, minimizes the amount of protective inner-packaging materials, and minimizes the amount of shipping space per package. For producers or distributors that handle a large quantity of objects that widely vary in size, the invention improves the efficiency of the packaging supply chain and reduces the amount of labor associated with packaging by improving the process of selecting and transporting protective cartons to the area(s) where products are packed.

The invention claimed is:

1. A system for making custom boxes for objects of random size or shape, comprising:
   physical measurement apparatus having a primary horizontal surface and a first vertical surface at an angle to the primary surface creating a first inside edge into which at least one object is positioned for measurement;
   each of the primary and first vertical surfaces including a two-dimensional matrix of computer-readable codes, each two-dimensional matrix including a plurality of computer-readable codes arranged along different axes, each code representing a distance from the first inside edge;
   a reader for reading the computer-readable codes associated with the greatest physical extent of the object in two dimensions, one of the dimensions being parallel to the horizontal surface and the other dimension being parallel to the first vertical surface; and
   a processor executing a software program operative to receive the codes from the reader and output instructions to a carton making machine to construct a custom carton to accommodate at least the two dimensions of the object.

2. The system of claim 1, wherein:
   the physical measurement apparatus includes a second vertical surface at an angle to both the primary surface and the first vertical surface, thereby creating a second inside edge and an inside corner into which at least one object is placed;
   the second vertical surface including a plurality of computer-readable codes enabling the reader to determine the greatest physical extent of the object in a third dimension from the second inside edge parallel to the second vertical surface; and
   the processor is further operative to receive the encoded distances from the reader and output instructions to a carton making machine to construct a three-dimensional custom carton to accommodate the object.

3. The system of claim 1, wherein the computer-readable codes are bar codes, and the reader is a bar-code scanner.

4. The system of claim 2, wherein the computer-readable codes are bar codes, and the reader is a bar-code scanner.

5. The system of claim 2, wherein the plurality of codes are arranged in a two-dimensional matrix on each surface, each matrix including a plurality of computer-readable codes arranged along different axes.

6. The system of claim 1, wherein the primary and first vertical surfaces are orthogonal to one another.

7. The system of claim 1, wherein the all of the surfaces are mutually orthogonal.

8. The system of claim 1, further including computer-readable control codes to CANCEL, REPEAT, or SEND the instructions to the carton-making machine.

9. A system for making custom boxes for objects of random size or shape, comprising:
   physical measurement apparatus having a primary horizontal surface and first and second vertical surfaces extending upwardly from the primary surfaces, all of the surfaces being mutually orthogonal, thereby creating an inside corner into which at least one object is positioned for measurement;
   each surface including a two-dimensional matrix of computer-readable codes, each two-dimensional matrix including a plurality of computer-readable codes arranged along different axes, each code encoding a distance to one of the edges;
   a reader for reading the computer-readable codes; and
   a processor executing a software program operative to receive the encoded distances from the reader and output instructions to a carton making machine to construct a three-dimensional custom carton to accommodate the object.

10. The system of claim 9, wherein the computer-readable codes are bar codes, and the reader is a bar-code scanner.

11. The system of claim 9, wherein the codes are arranged in a matrix on each surface.

12. The system of claim 9, further including computer-readable control codes to CANCEL, REPEAT, or SEND the instructions to the carton-making machine.

13. A method of fabricating a custom box for objects of random size or shape, comprising the steps of:
    providing a physical measurement apparatus having two or more mutually orthogonal surfaces, each surface including a two-dimensional matrix of computer-readable codes representing distances to one of the other surfaces, each two-dimensional matrix including a plurality of computer-readable codes arranged along different axes;
    placing at least one object into apparatus so as to contact as many of the surfaces as possible;
    reading the codes on each surface to determine the greatest physical extent of the object in multiple dimensions; and
    providing the dimensions to a carton making machine to construct a custom carton to accommodate the object in the multiple dimensions.

14. The method of claim 13, wherein the physical measurement apparatus includes a primary horizontal surface and two upstanding vertical surfaces.

15. The method of claim 13, wherein the computer-readable codes are scannable bar codes.

16. The method of claim 13, wherein the computer-readable codes are arranged in matrices on each surface.

* * * * *